(12) United States Patent
Belloso

(10) Patent No.: US 7,080,622 B1
(45) Date of Patent: Jul. 25, 2006

(54) INTERNAL COMBUSTION ENGINE WITH MULTIPLE INDEPENDENTLY ROTATING CRANKSHAFTS AND COMMON OUTPUT SHAFT

(76) Inventor: Gregorio M. Belloso, 5302 Chinaberry Dr., Salisbury, MD (US) 21801

( * ) Notice: Subject to any disclaimer, the term of this patent is extended or adjusted under 35 U.S.C. 154(b) by 0 days.

(21) Appl. No.: 11/032,672

(22) Filed: Jan. 11, 2005

(51) Int. Cl.
*F02B 75/18* (2006.01)
(52) U.S. Cl. .............................. 123/198 F; 123/DIG. 8
(58) Field of Classification Search ............ 123/198 F, 123/DIG. 8; 60/716, 718
See application file for complete search history.

(56) References Cited

U.S. PATENT DOCUMENTS

| | | | |
|---|---|---|---|
| 4,069,803 A * | 1/1978 | Cataldo | 123/198 F |
| 4,170,970 A | 10/1979 | McCandless | |
| 4,367,703 A * | 1/1983 | Maucher et al. | 123/198 F |
| 4,367,704 A * | 1/1983 | Maucher et al. | 123/198 F |
| 4,368,701 A * | 1/1983 | Huber et al. | 123/198 F |
| 4,389,985 A * | 6/1983 | Huber et al. | 123/198 F |
| 4,394,854 A * | 7/1983 | Huber | 123/198 F |
| 4,470,379 A | 9/1984 | Miyakoshi et al. | |
| 5,398,508 A * | 3/1995 | Brown | 60/718 |
| 5,732,668 A | 3/1998 | Di Stefano | |
| 6,205,972 B1 | 3/2001 | Di Stefano | |

* cited by examiner

*Primary Examiner*—T. M. Argenbright
(74) *Attorney, Agent, or Firm*—Norman Rainer

(57) ABSTRACT

A multi-cylinder internal combustion engine for a wheeled vehicle is divided into at least two power producing sub-units designated primary and secondary sub-units. The primary sub-unit operates during all powered movement of the vehicle. The secondary sub-unit is activated only when additional power is needed. When inactive, no fuel is delivered to the secondary sub-unit, and there is no movement of its components. Each sub-unit has its own crankshaft, and the crankshafts are connected by a clutch mechanism interactive with a single output shaft that delivers power to the wheels of the vehicle.

11 Claims, 9 Drawing Sheets

INTERNAL COMBUSTION ENGINE WITH MULTIPLE INDEPENDENTLY ROTATING CRANKSHAFTS AND COMMON OUTPUT SHAFT

BACKGROUND OF THE INVENTION

1. Field of the Invention

This invention relates to internal combustion engines, and more particularly concerns multi cylinder piston engines suitable for automotive vehicles and capable of shutting down some cylinders while cruising to reduce fuel consumption.

2. Description of the Prior Art

The rising cost of automotive fuel makes it desirable to improve the fuel economy of automotive vehicles. Many improvements in internal combustion engines have been made to maximize fuel economy. One such improvement is the development of an internal combustion engine capable of shutting down some cylinders when the need for power is lesser, such as when cruising on a highway, but is quickly capable of using all cylinders when more power is needed, such as when accelerating or climbing. This type of engine conserves fuel by shutting off the fuel supply to the non-functioning cylinders while keeping all valves open to avoid power drain due to what would have been the compression stroke. Meanwhile power continues to be produced by the remaining functioning cylinders, but with reduced fuel consumption.

Although the above-described improvement results in about 20% savings in fuel, it still has its disadvantages. One disadvantage is that, since all the pistons and connecting rods in this engine are connected to one common crankshaft, the pistons and connecting rods in the non-functioning cylinders continue to undergo reciprocating motion inside these cylinders, resulting in inertial and frictional power losses. The constant pumping of air into and out of the non-functioning cylinders (through the valve openings) also results in additional power loss. If these power losses can be eliminated, the fuel savings should be greater than the 20% currently achieved.

Numerous specialized modifications of multi-cylinder internal combustion engines have earlier been disclosed for achieving various results. The use of two or more separate crankshafts to serve some cylinders relative to the remaining cylinders has been described in U.S. Pat. Nos. 4,170,970; 4,470,379; 5,732,668 and 6,205,972. However, said separate crankshafts generally operate synchronously, and not in selectively alternating manner to accomplish results other than fuel economy.

It is accordingly an object of the present invention to provide a multi-cylinder internal combustion engine for use in an automotive vehicle and having improved efficiency of fuel consumption.

It is a further object of this invention to provide an engine as in the foregoing object which is compatible with automotive vehicles of present design.

It is a still further object of the present invention to provide an engine of the aforesaid nature capable of selectively and periodically deactivating some cylinders by fuel deprivation when their power is not needed.

It is yet another object of this invention to provide an engine of the aforesaid nature wherein the deactivation of said cylinders includes cessation of movement of otherwise moving components associated with said cylinders.

These objects and other objects and advantages of the invention will be apparent from the following description.

SUMMARY OF THE INVENTION

The above and other beneficial objects and advantages are accomplished in accordance with the present invention by a multi-cylinder internal combustion vehicle engine having conventional components such as pistons, connecting rods, fuel supply, ignition means and valving to achieve standard four cycle operation, said engine being divided into at least two power producing sub-units designated primary and secondary sub-units. The primary sub-unit, which includes at least half the number of cylinders and associated interactive components, is intended to be in operation during all powered movement of the vehicle. Said secondary sub-unit is optionally caused to become operational either by automatic or manual control when additional power is needed as for increased vehicle speed or hill-climbing. When the secondary sub-unit is inactive, no fuel is delivered to its cylinders, and there is no movement of associated components. In a similar manner of operation, a third sub-unit may be employed.

Each sub-unit has its own crankshaft. The crankshafts are connected by clutch means interactive with a single output shaft that delivers power to the wheels of the vehicle.

In order for each of the above-described sub-units to be operated independently as needed, each sub-unit has its own fuel supply means, ignition means, camshaft, air intake and exhaust valve means and manifold means, as well as all necessary operational control means, a fact that is well known to those skilled in the art.

The sub-units may be made using a single engine block to house all the cylinders with the crankshafts installed in a common crankcase to create a compact unit. This facilitates use of the crankshaft of the primary sub-unit as the common output shaft and permits direct substitution of this engine in place of engines currently in use in motor vehicles without the need for extensive modifications of the bell housing, clutch systems and other transmission connection means which may otherwise be necessary.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

For clarity of illustration, details of conventional engine and vehicle components which are not relative to the invention have been omitted from the aforesaid drawings, said components including: fuel supply means, air intake and exhaust valves, manifolds, camshafts, timing chains or gears, air-cooling or water-cooling means, and certain details of construction of clutch means, releasable couplings and torque converters.

DESCRIPTION OF THE PREFERRED EMBODIMENTS

Figure 1:
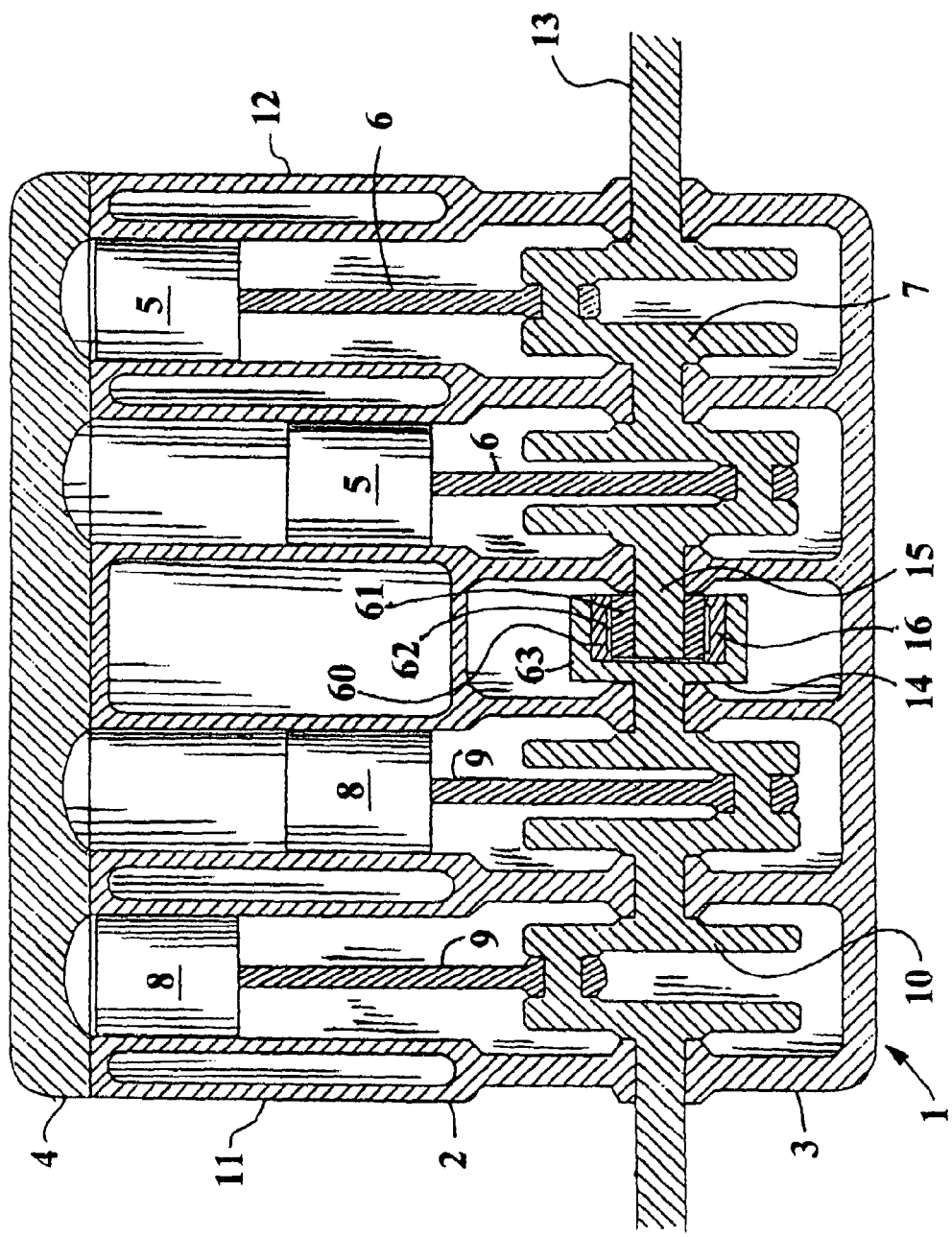
FIG. 1 is a sectional side view of a four-cylinder in-line engine embodiment of this invention.

Referring now to FIG. 1, there is shown an in-line four-cylinder engine 1, with engine block 2, crank case 3, and cylinder head 4. Engine 1 has a front end 11 and a rear end 12. Primary sub-unit pistons 5 are connected by primary sub-unit connecting rods 6 to primary crankshaft 7 in the conventional manner. Secondary sub-unit pistons 8 are connected by secondary sub-unit connecting rods 9 to secondary crankshaft 10 in the conventional manner as well. The engine 1 is thus functionally divisible into two sub-units: the primary sub-unit with pistons 5, connecting rods 6 and crankshaft 7, and the secondary sub-unit with pistons 8, connecting rods 9 and crankshaft 10. Each said sub-unit has its own associated fuel supply means, air intake and exhaust means, ignition means, and control means, so that each sub-unit can be operated essentially independently of the other.

Primary crankshaft 7 extends rearwardly through crankcase 3 as output shaft 13 which extends to the vehicle's transmission in the conventional manner. By virtue of such construction, the vehicle can be placed in operation even when only the primary sub-unit is running, particularly when less power is needed, such as for cruising on a level highway.

Primary crankshaft 7 is co-axial with secondary crankshaft 10 so that they both rotate on the same axis. That is, the axis of rotation of crankshaft 7 and the axis of rotation of crankshaft 14 both lie in one straight line. During operation, both crankshaft 7 and crankshaft 14 rotate in the same direction.

The rear end 14 of secondary crankshaft 10 is releasably connected to the front end 15 of primary crankshaft 7 by a suitable torque transmission means, which in this embodiment is the illustrated sprag clutch 16, although other types of clutches may be used.

Examples of other types of clutches are plate clutches (either single disc or multi disc), cone clutches, eddy current clutches (wherein torque is transmitted to electromagnetic attraction between rotating members), positive drive dog clutches wherein projections on one member fit into recesses in the other member, and various types of fluid clutches which transfer torque using a viscous fluid in a chamber; and then there are the various types of sprag clutches.

Figure 9:
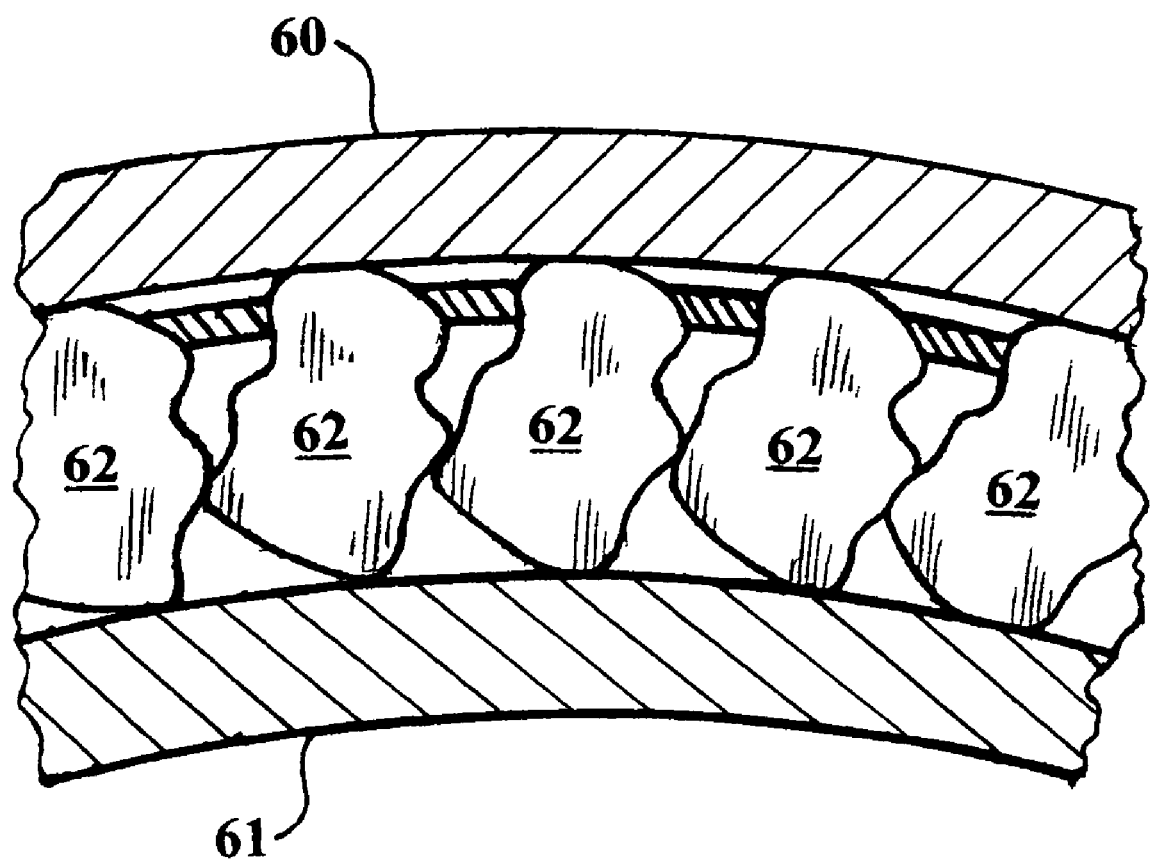
FIG. 9 is a schematic fragmentary internal view of a Sprag clutch useful in the engine of this invention.

A sprag clutch, as shown in FIG. 9, is basically an inner race 61 fitted inside an outer race 60. At least one race contains cam surfaces in the annulus between them. Sprags 62 of various types (balls, rollers, or steel blocks) are lodged within the annulus and positioned and shaped such that they will transmit power from one race to the other by a wedging action in the driving direction. Rotation in the other direction frees the sprags and the clutch is disengaged. Either race can be the driver.

Sprag clutches allow over-running, indexing and back-stopping operations and are extensively used in industry, such as in helicopters and motor vehicles. Some sprag clutches need only a torque wind-up of two to six degrees to engage or disengage, and some come with capacities of up to 560,000 ft-lbs of torque.

Returning again to FIG. 1, the outer race 60 of sprag clutch 16 is fixedly mounted within flange 63 at the rear end 14 of secondary crankshaft 10. Inner race 61 is fixedly mounted on the front end 15 of primary crankshaft 7. Proper selection and installation of sprag clutches for specific applications are well known to persons skilled in the art and need not be discussed in detail in this disclosure. Sprag clutch 16 is properly designed and installed so that it will transmit torque from secondary crankshaft 10 to primary crankshaft 7 whenever the rotational speed of crankshaft 10 exceeds the rotational speed of crankshaft 7, thereby instantly causing crankshafts 10 and 7 to rotate as a unit, and deliver their combined power to the transmission. Furthermore, sprag clutch 16 will automatically release crankshaft 10 from crankshaft 7 whenever the rotational speed of crankshaft 10 falls below that of crankshaft 7 such as when increased power is no longer needed and the speed of secondary crankshaft 10 is slowed back to idle, or stopped altogether, to conserve fuel.

Thus, whenever more power is needed, and particularly when the load is high enough to slow down the speed of the primary sub-unit, the secondary sub-unit (best kept running at idle speed) may then be revved up to run faster and deliver additional power through sprag clutch 16 to crankshaft 7, thence to the transmission to supply added power for acceleration, climbing, etc., as needed.

Although the embodiment described above shows the cylinders arranged in one longitudinal line from front to back, it is entirely possible for this invention to be embodied with the cylinders arranged in two rows, like the familiar V-8 engine, or in two opposed horizontal rows like the "boxer" four-cylinder or six-cylinder engines, with the rearward cylinders (and crankshafts, etc.) constituting the primary sub-unit, coupled in tandem with the forward cylinders and crankshaft, etc., constituting the secondary sub-unit, again using a sprag clutch or other suitable coupler.

Figure 2:
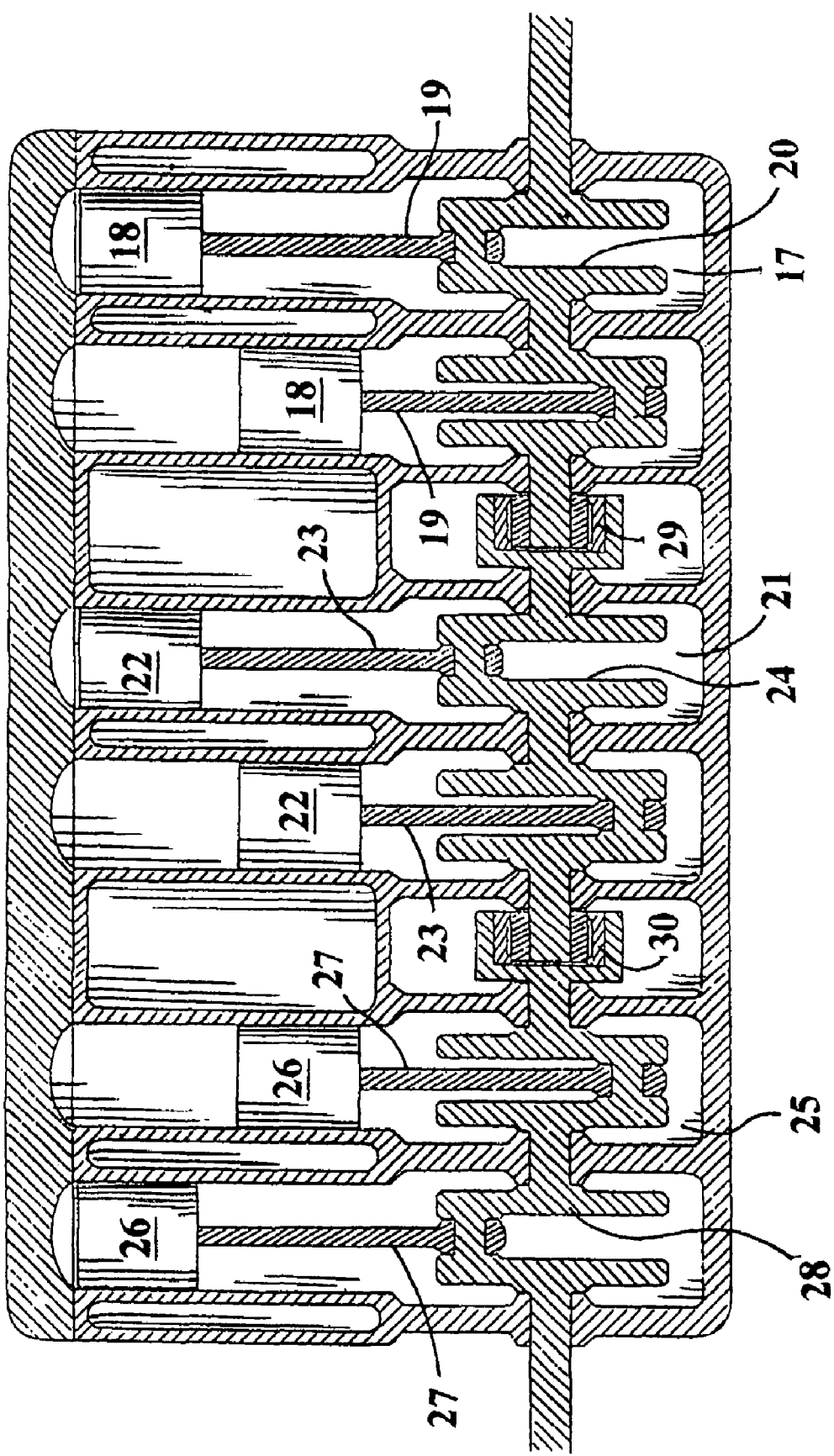
FIG. 2 is a sectional side view of an alternative six-cylinder in-line engine embodiment of this invention.

FIG. 2 illustrates an embodiment with three rather than two sub-units, for increased versatility. Primary sub-unit 17 includes primary pistons 18, primary connecting rods 19 and primary crankshaft 20. Secondary sub-unit 21 includes secondary pistons 22, secondary connecting rods 23 and secondary crankshaft 24. Tertiary sub-unit 25 includes tertiary pistons 26, tertiary connecting rods 27 and tertiary crankshaft 28. Primary sprag clutch 29 connects secondary crankshaft 24 to primary crankshaft 20, and secondary sprag clutch 30 connects tertiary crankshaft 28 to secondary crankshaft 24. This gives the operator three power levels in which to operate. To maintain cruising speed on a level highway he may choose to use only primary sub-unit 17, and run the other sub-units 21 and 25 at idle speed or even shut them down. He may use sub-units 17 and 21 for moderate power needs, and use all three sub-units 17, 21 and 25 when maximum power is needed. This results in improved performance flexibility and increased fuel efficiency.

Figure 3:
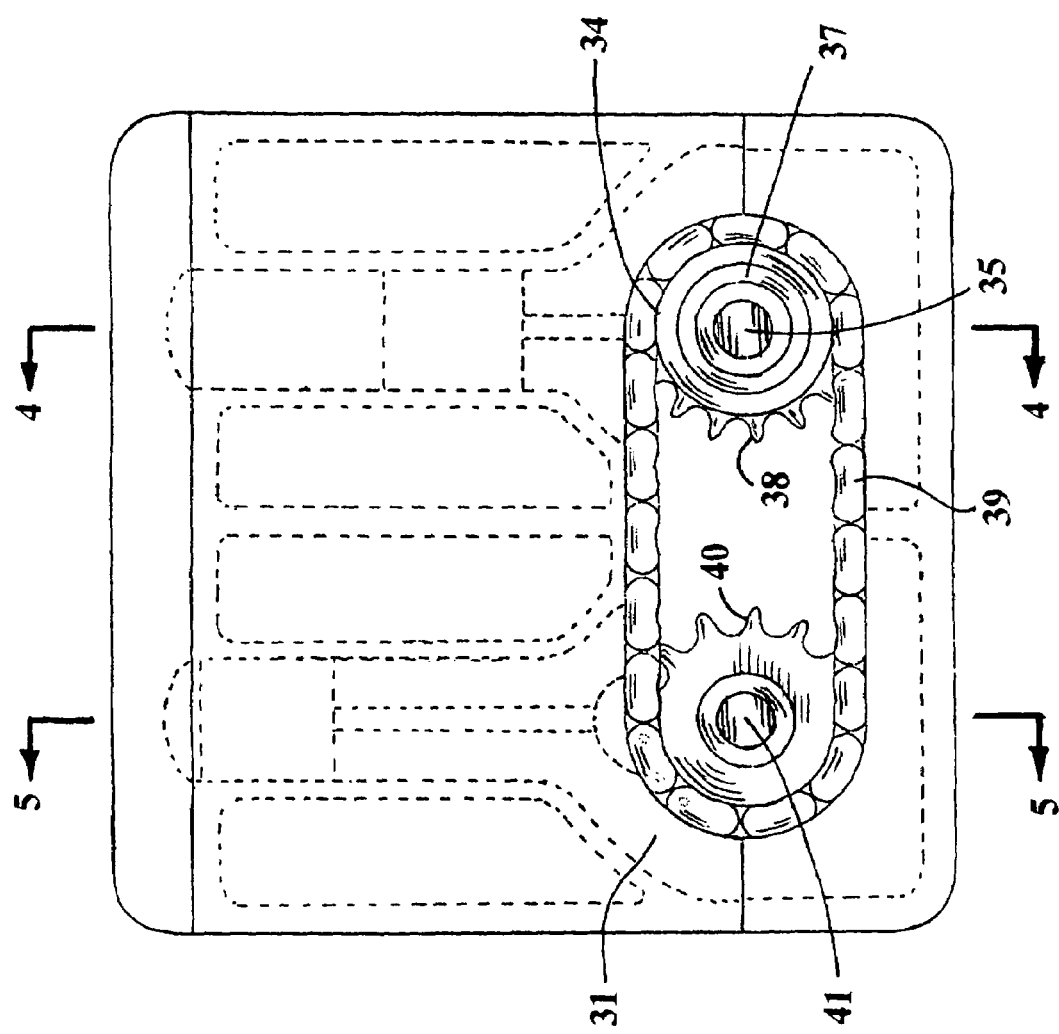
FIG. 3 is a front view of a second alternative embodiment of this invention having eight cylinders in two parallel lines, with phantom depiction of the cylinders, pistons and connecting rods therein.
Figure 4:
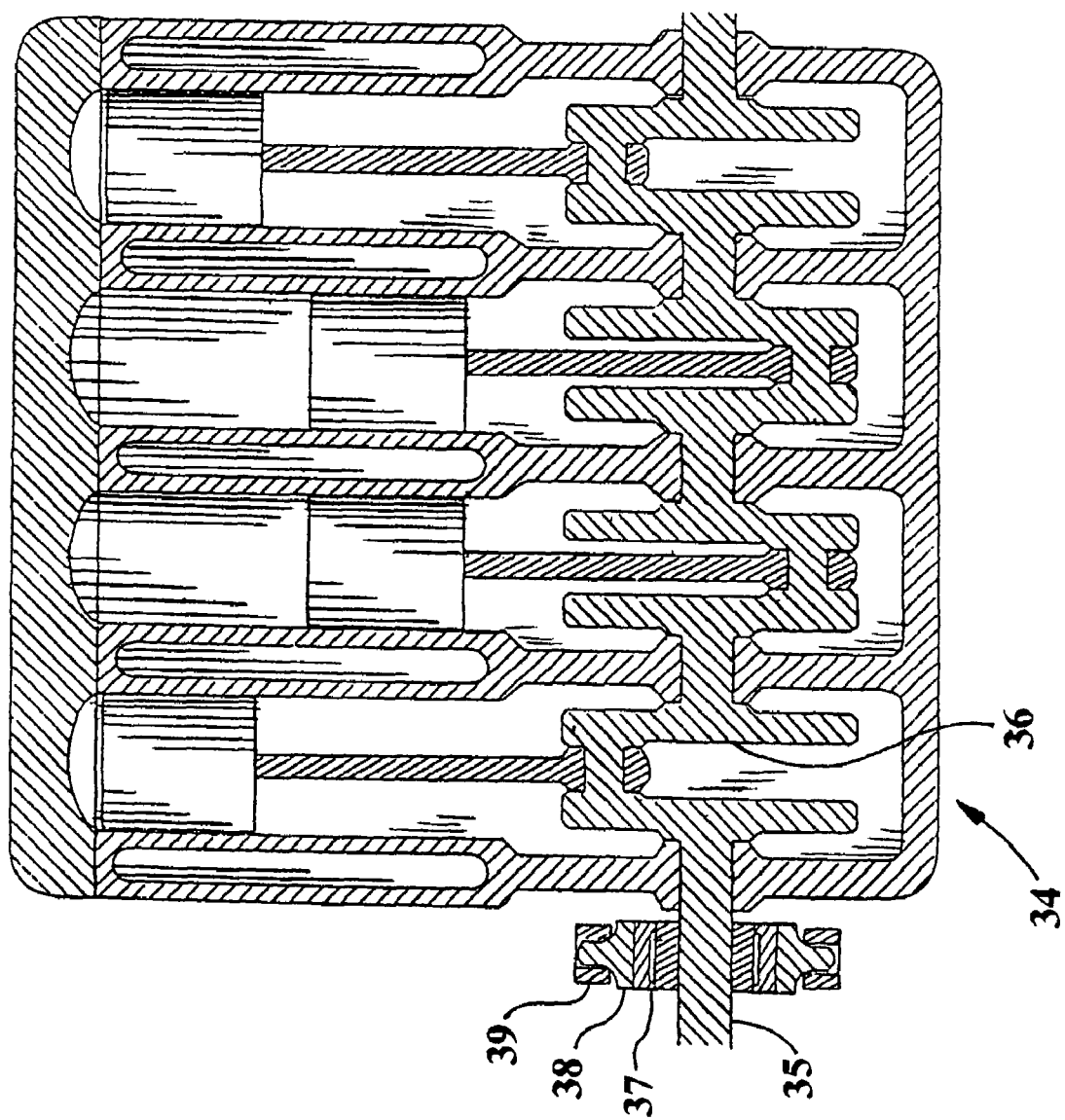
FIG. 4 is a sectional view taken in the direction of the arrows upon line 4—4 of FIG. 3.
Figure 5:
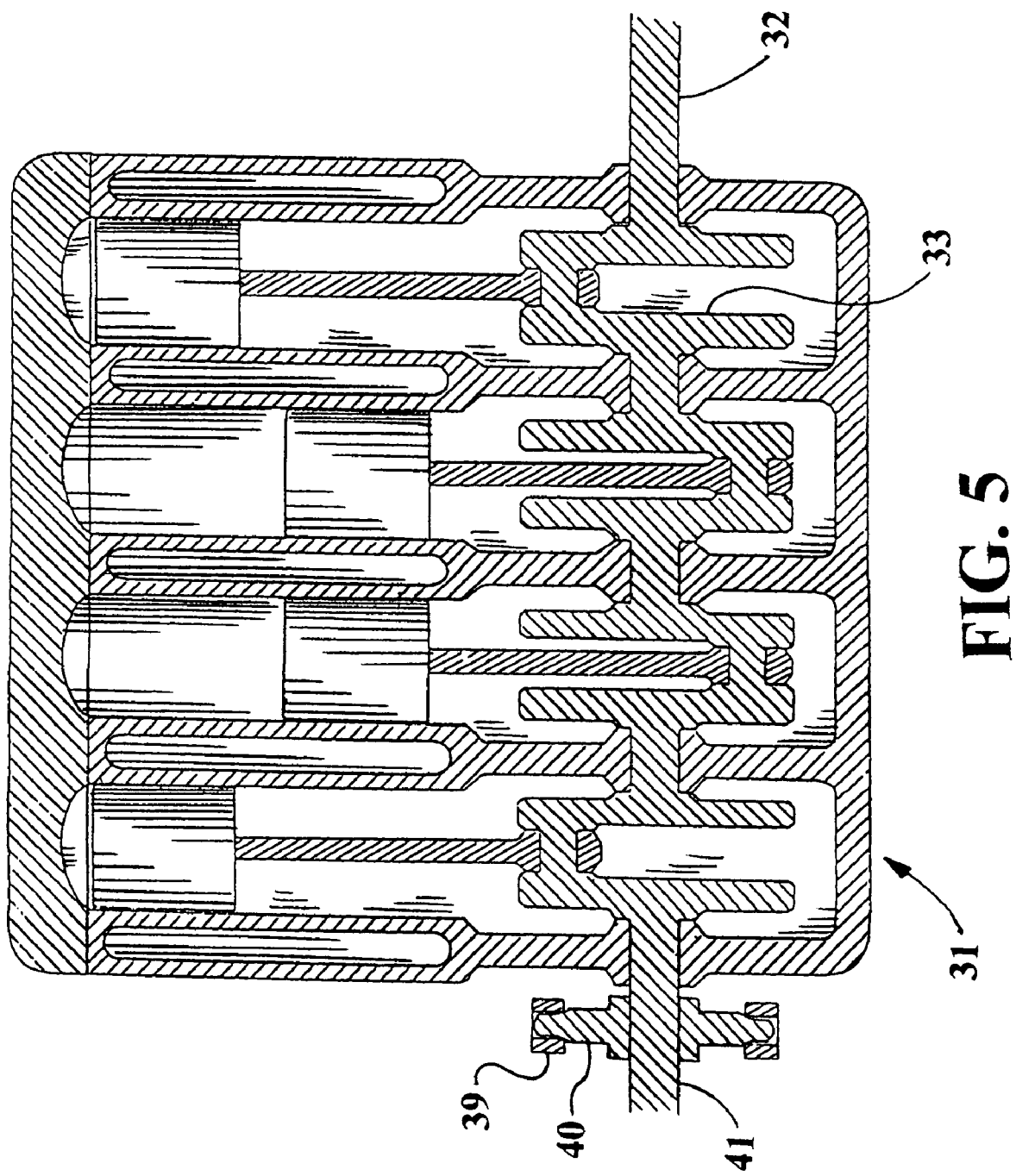
FIG. 5 is a sectional view taken in the direction of the arrows upon the line 5—5 of FIG. 3.

FIGS. 3, 4 and 5 illustrate a second alternative embodiment with the primary sub-unit 31 and the secondary sub-unit 34 placed parallel to each other in contrast to the previously described embodiments wherein the engine sub-units (17, 21 and 25) were arranged in line with each other. Power from primary sub-unit 31 is transmitted to the transmission (not shown) from the rear end 32 of primary crankshaft 33. Power from secondary sub-unit 34 is transmitted from the front end 35 of secondary crankshaft 36 through clutch means 37 thence through clutch-mounted power transfer means exemplified as drive sprocket 38 and drive chain 39 interactive with driven sprocket 40 mounted on the front end 41 of primary crankshaft 33. Clutch means 37 is preferably a sprag clutch, however other types of power-transmitting clutches or couplings may be used, such as a centrifugal clutch, fluid coupling, torque converter or other types of clutches already discussed.

Figure 6:
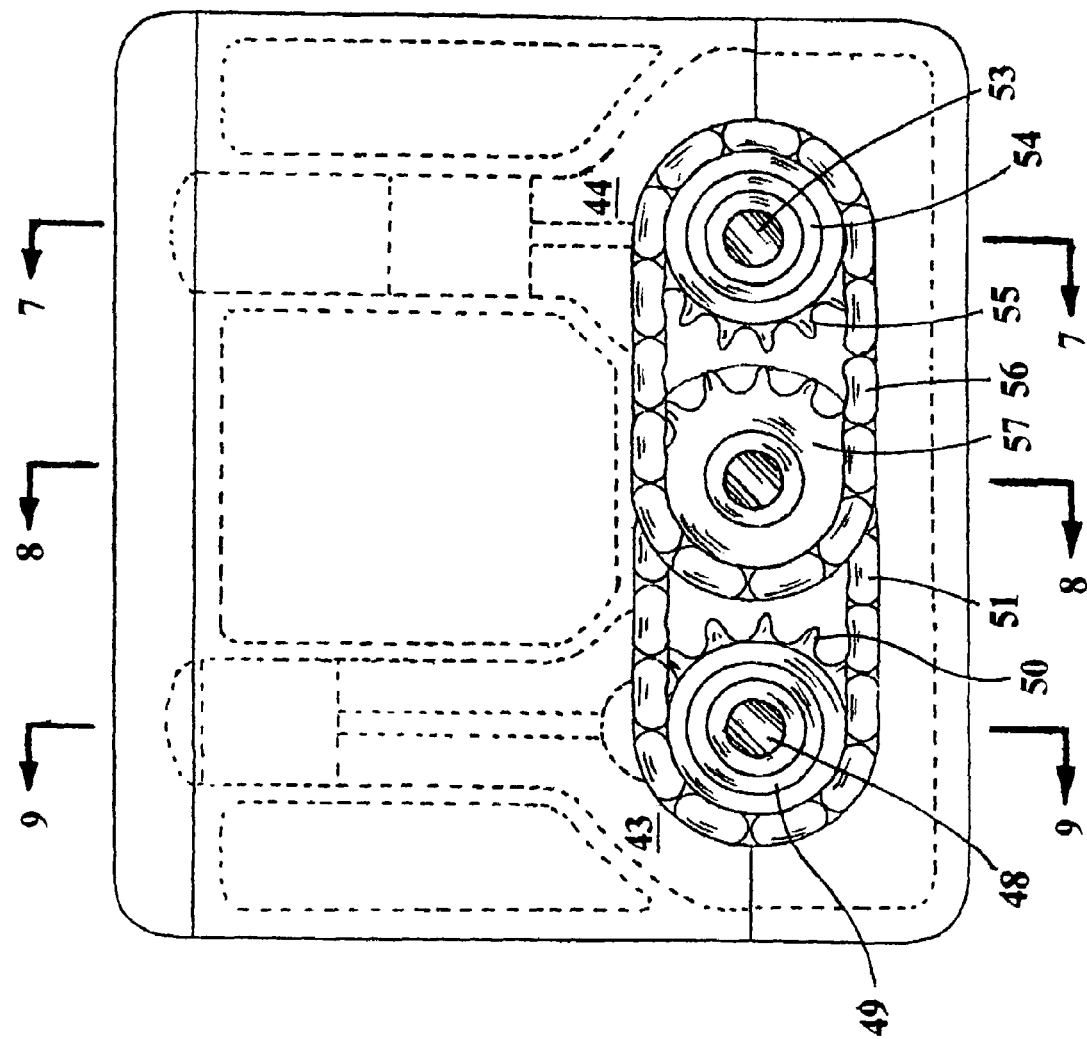
FIG. 6 is a front view of a third alternative embodiment of an engine of this invention having eight-cylinders, with phantom depiction of the cylinders, pistons and connecting rods therein.
Figure 7:
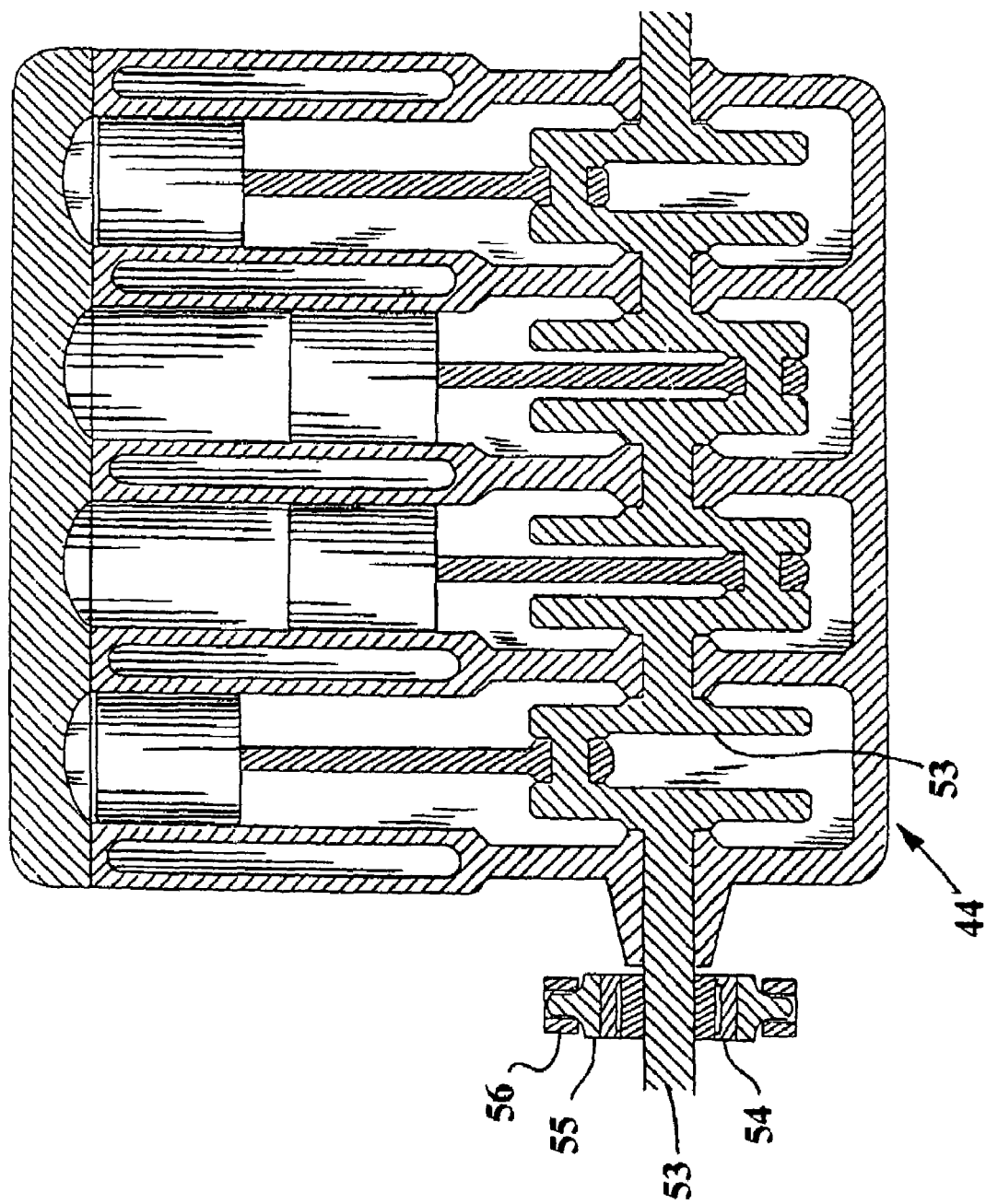
FIG. 7 is a sectional view taken in the direction of the arrows upon line 7—7 of FIG. 6.
Figure 8:
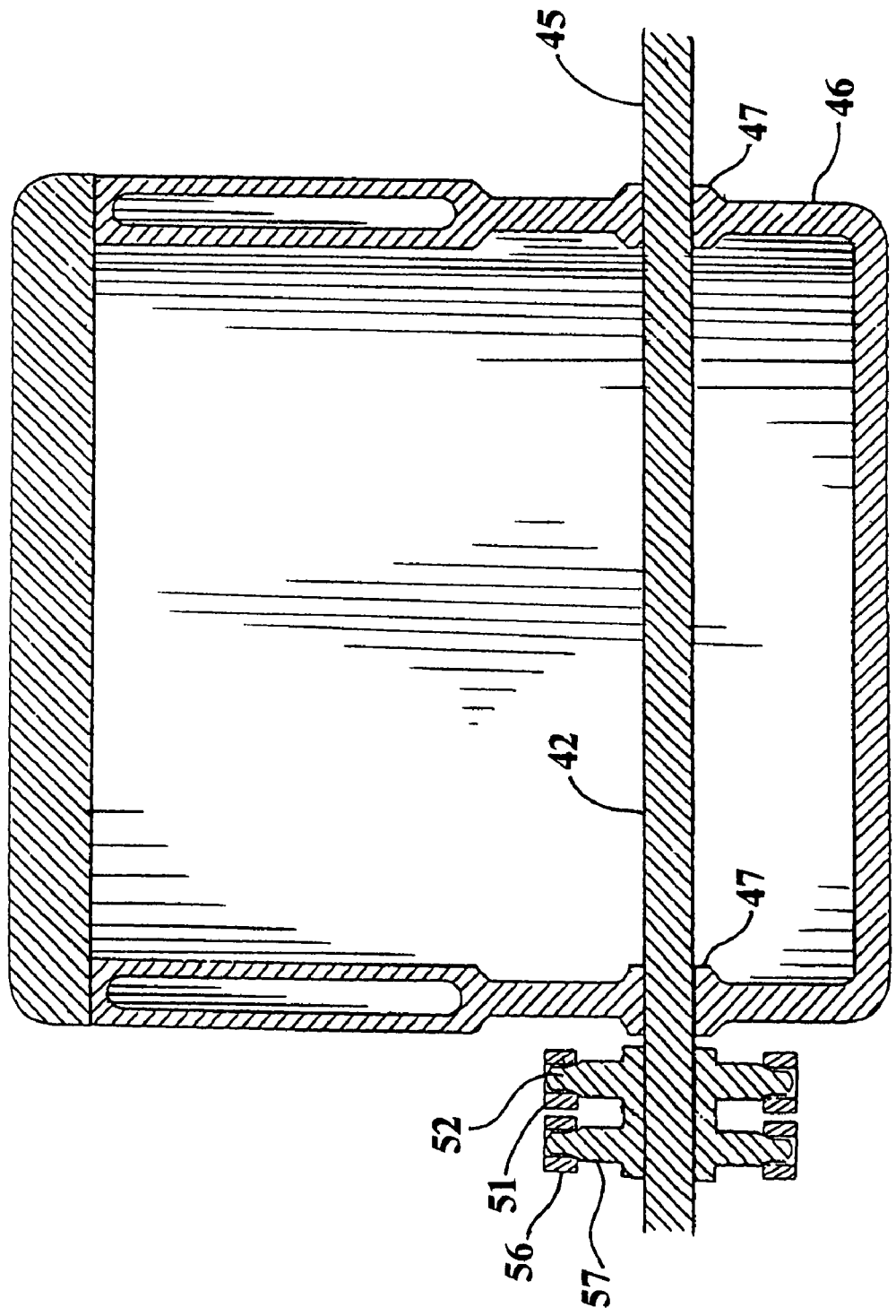
FIG. 8 is a sectional view taken in the direction of the arrows upon the line 8—8 of FIG. 6.

FIGS. 6, 7 and 8 illustrate yet another alternative embodiment wherein a separate dedicated output shaft 42 receives power from either the first sub-unit 43 or the second sub-unit 44 or from both sub-units 43 and 44 simultaneously. The rear end 45 of output shaft 42 engages the vehicle's transmission (not shown) in the conventional manner, and is journaled to the crankcase 46 by bearings 47. Power from primary crankshaft 48 is transmitted through primary clutch means 49 thence through primary drive sprocket 50 and primary drive chain 51 to primary driven sprocket 52 which is fixedly mounted on output shaft 42 as shown. Similarly, power from secondary crankshaft 53 is transmitted through secondary clutch means 54 thence through secondary drive sprocket 55 and secondary drive chain 56 to secondary driven sprocket 57 which is also fixedly mounted on output shaft 42. For light-load fuel-saving operation power may be had from either engine sub-unit 43 or 44 while the "non-working" sub-unit is at idle or stopped. For heavier operation, power can be had from both sub-units 43 and 44 simultaneously. As in the previous embodiments, clutch means 49 and 54 may be a sprag clutch or any of the other types of couplings or clutches already mentioned.

The cylinders of the primary sub-unit may have a different diameter than the cylinders of the secondary sub-unit. Also, each sub-unit may operate on a different liquid fuel. For example, it may be desirable in some instances to construct an engine embodying this invention wherein the primary sub-unit runs on diesel fuel for economical long-distance operation, while the secondary sub-unit runs on gasoline to achieve quick throttle response.

Activation of a secondary sub-unit may be achieved by means of an on/off electrical switch associated with the conventional accelerator pedal of the vehicle. When fully depressed, the pedal may turn such switch to the "on" position, thereby causing fuel to be advanced from a secondary fuel pump to the secondary cylinders. Alternatively, the advanced fuel may emerge from a control valve associated with a single fuel pump which serves both primary and secondary sub-unit cylinders. The amount of fuel routed to the secondary sub-unit is equivalent to the amount of fuel supplied to the primary sub-unit.

Although these preferred embodiments have been described in great detail, it is to be understood that various changes and modifications may be made therein without departing from the spirit and scope of the invention which is more fully defined in the appended claims.

What is claimed is:

1. In a multi-cylinder internal combustion engine for a wheeled vehicle, said engine including conventional operational components to achieve standard four cycle operation within a single engine block, the improvement wherein said engine is divided into two power producing sub-units designated primary and secondary sub-units, said primary sub-unit including at least half the number of cylinders and adapted to operate during all powered movement of the vehicle, said secondary sub-unit being activatable optionally when additional power is needed, and when inactive receives substantially no fuel, each sub-unit having its own crankshaft and other conventional operational components, said crankshafts rotating in the same direction within a single crankcase and interconnected by a sprag clutch interactive with a single output shaft that delivers power to the wheels of the vehicle, said output shaft being a continuation of the crankshaft of said primary sub-unit.

2. The internal combustion engine of claim 1 wherein said sprag clutch is comprised of an outer circular race and an inner circular race disposed concentrically within said outer race and thereby defining therebetween an annular region, and a series of identical sprags disposed within said annular region and shaped such that their interabutment causes power to be transmitted between said races.

3. The internal combustion engine of claim 1 having an in-line arrangement of all cylinders.

4. The internal combustion engine of claim 1 wherein the crankshafts of said primary and second sub-units rotate upon the same axis.

5. The internal combustion engine of claim 1 wherein each of said crankshafts have front and rear ends, and wherein the rear end of the crankshaft of the secondary sub-unit is connected by way of said sprag clutch to the front end of the crankshaft of said primary sub-unit.

6. The internal combustion engine of claim 1 wherein the cylinders of the primary sub-unit are arranged in a first row, and the cylinders of the secondary sub-unit are arranged in a second row parallel to said first row.

7. The internal combustion engine of claim 6 wherein power transfer means intervene between said sprag clutch and an associated crankshaft.

8. The internal combustion engine of claim 7 wherein said power transfer means is a drive chain and interactive sprocket wheel.

9. The internal combustion engine of claim 1 wherein activation of said secondary sub-unit is achieved by an on/off electrical switch associated with a conventional accelerator pedal of said vehicle.

10. The internal combustion engine of claim 1 wherein movement of components of said secondary sub-unit cease when said secondary sub-unit is inactive.

11. The internal combustion engine of claim 1 wherein said secondary sub-unit operates at an idle rate when it is in an inactive state.

* * * * *